United States Patent
Kim

(10) Patent No.: US 11,709,264 B2
(45) Date of Patent: Jul. 25, 2023

(54) POSITION DETECTION SYSTEM AND METHOD USING SENSOR

(71) Applicant: HYUNDAI MOBIS Co., Ltd., Seoul (KR)

(72) Inventor: Ji Su Kim, Seongnam-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 332 days.

(21) Appl. No.: 17/135,118

(22) Filed: Dec. 28, 2020

(65) Prior Publication Data

US 2022/0082689 A1 Mar. 17, 2022

(30) Foreign Application Priority Data

Sep. 16, 2020 (KR) .................. 10-2020-0119196

(51) Int. Cl.
*G01S 15/89* (2006.01)
*G01S 15/42* (2006.01)
*G01S 15/931* (2020.01)

(52) U.S. Cl.
CPC .............. *G01S 15/89* (2013.01); *G01S 15/42* (2013.01); *G01S 15/931* (2013.01); *G01S 2015/937* (2013.01)

(58) Field of Classification Search
CPC ............................... G01S 15/89; G01S 15/931
See application file for complete search history.

(56) References Cited

U.S. PATENT DOCUMENTS

| 6,396,435 B1 | 5/2002 | Fleischhauer et al. |
| 2015/0138358 A1 | 5/2015 | Seo et al. |
| 2018/0059680 A1* | 3/2018 | Tateishi ................ G01S 17/931 |
| 2018/0100921 A1 | 4/2018 | Bang |
| 2018/0299893 A1* | 10/2018 | Qin ..................... G05D 1/0246 |
| 2019/0270455 A1 | 9/2019 | Woo |

FOREIGN PATENT DOCUMENTS

| JP | 6333412 | 5/2018 |
| KR | 10-2000-0062430 | 10/2000 |
| KR | 10-2015-0058903 | 5/2015 |
| KR | 10-2016-0066757 | 6/2016 |
| KR | 10-2017-0077314 | 7/2017 |

(Continued)

OTHER PUBLICATIONS

JPWO2016103464—translation of WO2016103464 (Year: 2016).*
Extended European Search Report dated May 19, 2021, issued in European Patent Application No. 20215588.3.

*Primary Examiner* — Michael J Dalbo
*Assistant Examiner* — Kaleria Knox
(74) *Attorney, Agent, or Firm* — H.C. Park & Associates, PLC

(57) ABSTRACT

A position detection system using a sensor, including a sensor unit including a plurality of sensors for transmitting a transmission signal or receiving a reflection signal reflected from an obstacle and configured to acquire a time of flight (TOF) of the received reflection signal, a storage unit configured to pre-store a position map of the obstacle for respective sensors depending on the TOF of the reflection signal on a grid map including a plurality of cells, and a position estimator configured to estimate a position of the obstacle based on the TOF of the reflection signal received by the sensor unit and the position map of the obstacle pre-stored in the storage unit.

12 Claims, 7 Drawing Sheets

(56) References Cited

FOREIGN PATENT DOCUMENTS

| KR | 10-2018-0039942 | 4/2018 | | |
|---|---|---|---|---|
| KR | 10-2019-0104662 | 9/2019 | | |
| KR | 10-2019-8450000 | 9/2019 | | |
| KR | 10-2019845 | 9/2019 | | |
| KR | 10-2020-0058758 | 5/2020 | | |
| WO | 2016103464 | 6/2016 | | |
| WO | WO-2016103464 A1 * | 6/2016 | ............. | B60R 21/00 |
| WO | WO-2019053812 A1 * | 3/2019 | | |
| WO | WO-2019058507 A1 * | 3/2019 | ............. | G01S 13/42 |

* cited by examiner

POSITION DETECTION SYSTEM AND METHOD USING SENSOR

CROSS-REFERENCE TO THE RELATED APPLICATION

This application claims priority from Korean Patent Application No. 10-2020-0119196, filed on Sep. 16, 2020, which is hereby incorporated by reference for all purposes as if set forth herein.

BACKGROUND

Field

Exemplary embodiments relate to a position detection system and method using a sensor, and more particularly to technology for detecting the position of an obstacle using a plurality of sensors for detecting an obstacle.

Discussion of the Background

Distance measurement is a basic method for measuring a dimension, such as the length, the width, or the area, of a measurement target object, and is widely used throughout industry as well as in daily life. With advancements in science and technology, the concept of and the requirements for measurement are also changing and advancing, and with increased measurement precision and speed, manufactured products are being miniaturized and refined at a remarkable rate, and the speed of manufacture of products is rapidly increasing.

In particular, a plurality of sensors is installed in a vehicle for parking collision-avoidance assistance (PCA) of the vehicle, and the position of an obstacle is estimated using signals detected by the installed sensors.

In particular, an ultrasonic sensor is mainly used to measure a distance from an obstacle. The ultrasonic sensor emits a high-frequency signal having a short wavelength to the outside at a predetermined time interval. The emitted signal spreads at the speed of sound in the air and reaches a target object. The ultrasonic sensor calculates the distance to a target object from a reference point using the time taken to receive an echo signal returned back from the target object.

According to the related art, an intersection point with respect to a circle using an ultrasonic sensor as the center is calculated based on an equation describing the circle in order to estimate the position of an obstacle using the ultrasonic sensor.

However, a large amount of computation is required to calculate the intersection point using signals sensed by the plurality of ultrasonic sensors, and in particular, in the case of indirect waves, the sensors are spaced apart from each other, and thus the intersection point needs to be calculated using an equation describing an oval, but, in order to prevent an increase in the amount of computation, direct waves are assumed, and the intersection point is calculated using an equation describing a circle. Accordingly, there is a problem in that the accuracy of estimation of the position of an obstacle is degraded.

The above information disclosed in this Background section is only for enhancement of understanding of the background of the invention and, therefore, it may contain information that does not constitute prior art.

SUMMARY

Exemplary embodiments of the present invention provide technology for detecting the position of an obstacle sensed by a plurality of sensors using a simple comparison instead of complicated computation.

An exemplary embodiment of the present invention provides a position detection system including a sensor unit including a plurality of sensor for transmitting a transmission signal or receiving a reflection signal reflected off an obstacle and configured to acquire a time of flight (TOF) of the received reflection signal, a storage unit configured to pre-store a position map of the obstacle for respective sensors depending on the TOF of the reflection signal on a grid map including a plurality of cells, and a position estimator configured to estimate a position of the obstacle based on the TOF of the reflection signal received by the sensor unit and the position map of the obstacle pre-stored in the storage unit.

The plurality of sensors may be spaced apart from each other in a lateral direction of a vehicle on front and rear sides of the vehicle and transmit different transmission signals.

The grid map including the plurality of cells may include a plurality of rows and columns that extend parallel to longitudinal and lateral directions of the vehicle from the front or rear side of the vehicle.

The storage unit may pre-store each of a position map of the obstacle based on a direct wave in a case in which the sensor for transmitting the transmission signal and the sensor for receiving the reflection signal are the same and a position map of the obstacle based on an indirect wave in a case in which the sensor for transmitting the transmission signal and the sensor for receiving the reflection signal are different.

The position maps of the obstacle based on the direct wave may be pre-stored in a range of a distance by which the obstacle is spaced apart from sensors depending on the TOF of the reflection signal on the grid map.

The position maps of the obstacle based on the indirect wave may be pre-stored in a range of a distance by which the obstacle is spaced apart from sensors depending on the TOF of the reflection signal, which is a sum of a distance to a position of a sensor for transmitting a signal and a distance to a position of a sensor for receiving the signal on the grid map.

The position estimator may estimate a cell occupied by an obstacle depending on the TOF of the received reflection signal on pre-stored position maps of the obstacle and may estimate the position of the obstacle based on the estimated occupied cell.

The position estimator may estimate a cell in which occupied cells overlap each other using a position map of the obstacle based on a direct wave or an indirect wave or position maps of the obstacle, which are respectively estimated by the plurality of sensors, as the position of the obstacle.

The position estimator may apply a higher weight to an occupied cell estimated using the position map of the obstacle based on the direct wave than to an occupied cell estimated using the position map of the obstacle based on the indirect wave.

The position estimator may divide the grid map into a plurality of sections and may estimate the position of the obstacle using only a reflection signal that is transmitted or received by some sensors that are preset among the plurality of sensors for each section resulting from division.

The position estimator may divide the grid map into a plurality of sections, and when a number of positions of the obstacle estimated in the sections resulting from division is equal to or greater than a preset number, the number of positions of the obstacle may be reduced by clustering the positions of the obstacle.

Another exemplary embodiment of the present invention provides a position detection method including storing a position map of an obstacle depending on a time of flight (TOF) of a reflection signal on a grid map including a plurality of cells, acquiring the TOF of the reflection signal received by the plurality of sensors for transmitting a transmission signal or receiving the reflection signal reflected from the obstacle, and estimating a position of the obstacle by applying the TOF of the reflection signal received by each sensor to pre-stored position maps of the obstacle.

The storing the position map of the obstacle may include storing each of position maps of the obstacle based on a direction wave in a case in which a sensor for transmitting a transmission signal and a sensor for receiving a reflection signal are the same and an indirect wave in a case in which the sensor for transmitting the transmission signal and the sensor for receiving the reflection signal are different.

The estimating the position of the obstacle may include estimating a cell occupied by the obstacle depending on the TOF of the reflection signal received on the pre-stored position maps of the obstacle and estimating the position of the obstacle based on the estimated occupied cell.

The estimating the position of the obstacle may include estimating a cell in which occupied cells overlap each other using the position map of the obstacle based on a direct wave or an indirect wave or position maps of the obstacle, which are respectively estimated by the plurality of sensors, as the position of the obstacle.

The estimating the position of the obstacle may include dividing the grid map into a plurality of sections and estimating the position of the obstacle using only a reflection signal that is transmitted or received by some sensors that are preset among the plurality of sensors for each section resulting from division.

The position detection may further include, after the estimating the position of the obstacle, dividing the grid map into a plurality of sections and reducing a number of positions of the obstacle by clustering the positions of the obstacle when a number of the positions of the obstacle estimated in the sections resulting from division is equal to or greater than a preset number.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
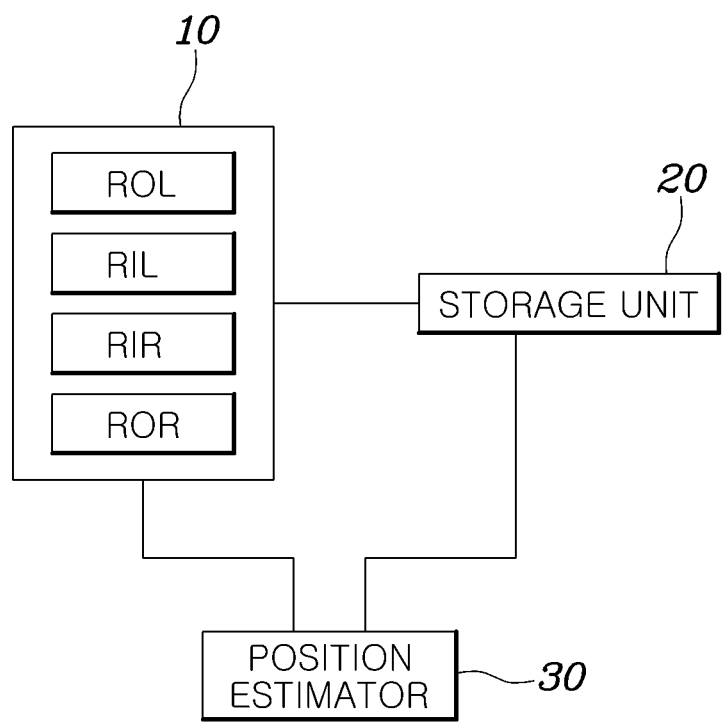
FIG. 1 is a diagram showing the configuration of a position detection system using a sensor according to an exemplary embodiment of the present invention.

In exemplary embodiments of the present invention disclosed in the specification, specific structural and functional descriptions are merely illustrated for the purpose of illustrating embodiments of the invention and exemplary embodiments of the present invention may be embodied in many forms and are not limited to the embodiments set forth herein.

Exemplary embodiments of the present invention can be variously changed and embodied in various forms, in which illustrative embodiments of the invention are shown. However, exemplary embodiments of the present invention should not be construed as being limited to the embodiments set forth herein and any changes, equivalents or alternatives which are within the spirit and scope of the present invention should be understood as falling within the scope of the invention.

It will be understood that although the terms first, second, third etc. may be used herein to describe various elements, these elements should not be limited by these terms. These terms are only used to distinguish one element from another element. For example, a first element may be termed a second element and a second element may be termed a first element without departing from the teachings of the present invention.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements or layers should be interpreted in a like fashion, e.g., "between," versus "directly between," "adjacent," versus "directly adjacent," etc.

The terms used in the present specification are used for explaining a specific exemplary embodiment, not limiting the present invention. Thus, the singular expressions in the present specification include the plural expressions unless clearly specified otherwise in context. Also, terms such as "include" or "comprise" may be construed to denote a certain characteristic, number, step, operation, constituent element, or combination thereof, but may not be construed to exclude the existence of or possibility of addition of one or more other characteristics, numbers, steps, operations, constituent elements, or combinations thereof.

Unless otherwise defined, all terms including technical and scientific terms used herein have the same meaning as commonly understood by one of ordinary skill in the art to which this present invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made in detail to the embodiments, examples of which are illustrated in the accompanying drawings. In the drawings, the same reference numerals in the drawings denote corresponding elements.

Figure 2:
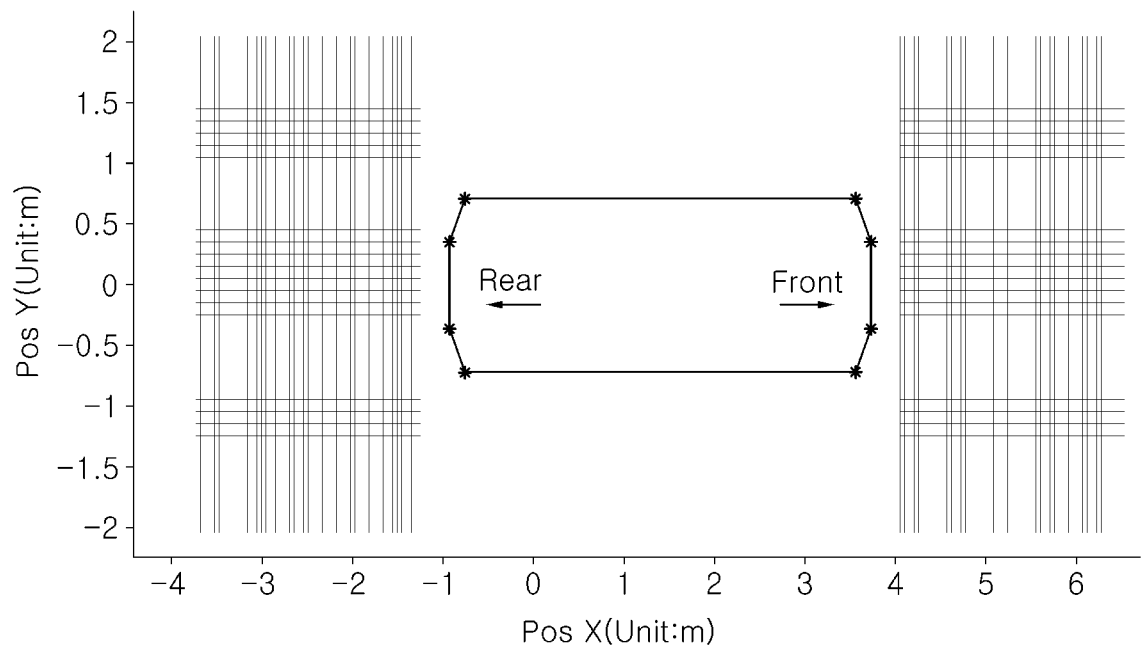
FIG. 2 is a diagram showing grid maps including a plurality of cells according to an exemplary embodiment of the present invention.
Figure 3:
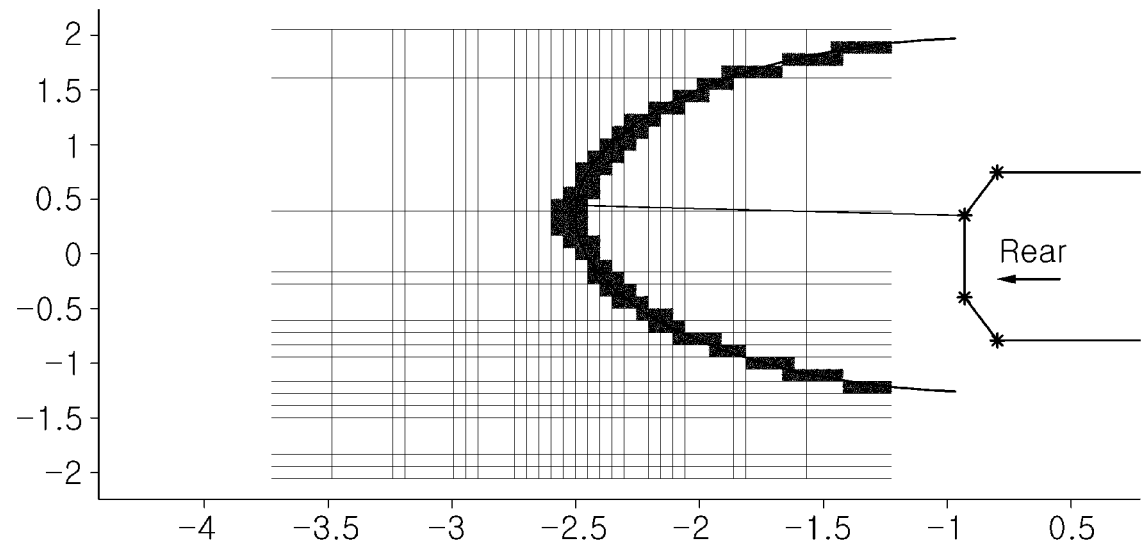
FIG. 3 is a diagram showing a position map of an obstacle according to an exemplary embodiment of the present invention.
Figure 3:
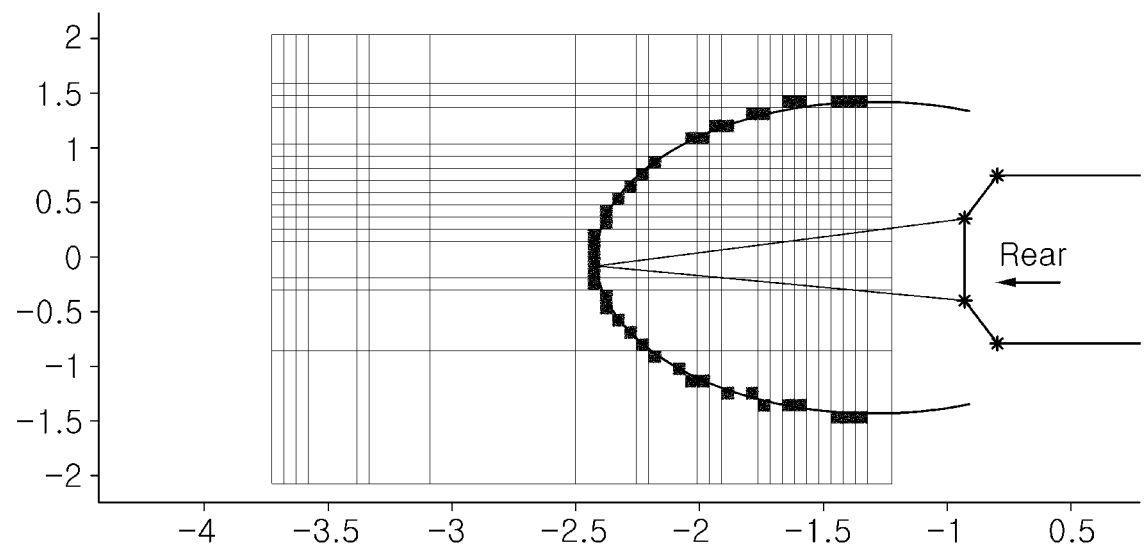

FIG. 1 is a diagram showing the configuration of a position detection system using a sensor according to an embodiment of the present invention. FIG. 2 is a diagram showing grid maps including a plurality of cells according to an embodiment of the present invention. FIG. 3 is a diagram showing a position map of an obstacle according to an embodiment of the present invention.

Referring to FIGS. 1 to 3, the position detection system using the sensor according to an embodiment of the present invention may include a sensor unit 10 including a plurality of sensors ROL, RIL, RIR, and ROR for transmitting a transmission signal or receiving a reflection signal reflected off the obstacle and configured to acquire a time of flight (TOF) of the received reflection signal, a storage unit 20 for pre-storing a position map of the obstacle for the respective sensors depending on the TOF of the reflection signal on a grid map including a plurality of cells, and a position estimator 30 for estimating the position of the obstacle based on the TOF of the reflection signal received by the sensor unit 10 and the position map of the obstacle pre-stored in the storage unit 20.

The sensor unit 10, the storage unit 20, and the estimator according to an exemplary embodiment of the present invention may be embodied through a processor (not shown) configured to perform an operation that is described below using data stored in a non-volatile memory (not shown) and a corresponding memory, which are configured to store data about an algorithm for controlling operations of various components of a vehicle or software commands for reproducing the algorithm. Here, the memory and the processor may be embodied in separate chips. Alternatively, the memory and the processor may be embodied in a single integrated chip. The processor may be configured in the form of one or more processors.

The sensor unit 10 may include the plurality of sensors ROL, RIL, RIR, and ROR. Each of the plurality of sensors ROL, RIL, RIR, and ROR may include a transmission device and a reception device and may transmit a transmission signal or may receive a reflection signal formed by reflecting the transmission signal off the obstacle.

According to an embodiment, each of the plurality of sensors ROL, RIL, RIR, and ROR included in the sensor unit 10 may be an ultrasonic sensor for transmitting or receiving an ultrasonic signal, or according to another embodiment, each of the sensors may be an omnidirectional sensor such as a subminiature radar sensor for transmitting or receiving an electromagnetic wave.

The sensor unit 10 may acquire a time of flight (TOF) of the reflection signal based on the reflection signal received from each sensor. Here, the TOF may be half of the time taken to receive the reflection signal obtained by reflecting the transmission signal, transmitted from the ultrasonic sensor, off the object.

In detail, in the case of an obstacle located a long distance from a sensor, the TOF may be long, but in the case of an obstacle located a short distance therefrom, the TOF may be short.

The storage unit 20 may be a kind of non-volatile memory, and a position map of an obstacle depending on a TOF on a grid map may be pre-stored for each sensor.

According to an embodiment, the grid map may be a map including a plurality of cells defined by a plurality of rows and a plurality of columns and may be formed on front and rear sides of a vehicle.

The position map of the obstacle depending on the TOF for each sensor on the grid map may be pre-stored in the storage unit 20. In particular, the position map of the obstacle may be stored differently depending on whether the reflection signal is an indirect wave or a direct wave as described below.

That is, the plurality of position maps of the obstacle for the respective sensors may be stored in the storage unit 20, and any one may be selected from the stored position maps of the obstacle depending on the TOF and whether the received reflection signal is a direct wave or an indirect wave.

The position estimator 30 may estimate the position of the obstacle based on the TOF of the reflection signal received by the sensor unit 10 and the position map of the obstacle pre-stored in the storage unit 20.

Figure 4:
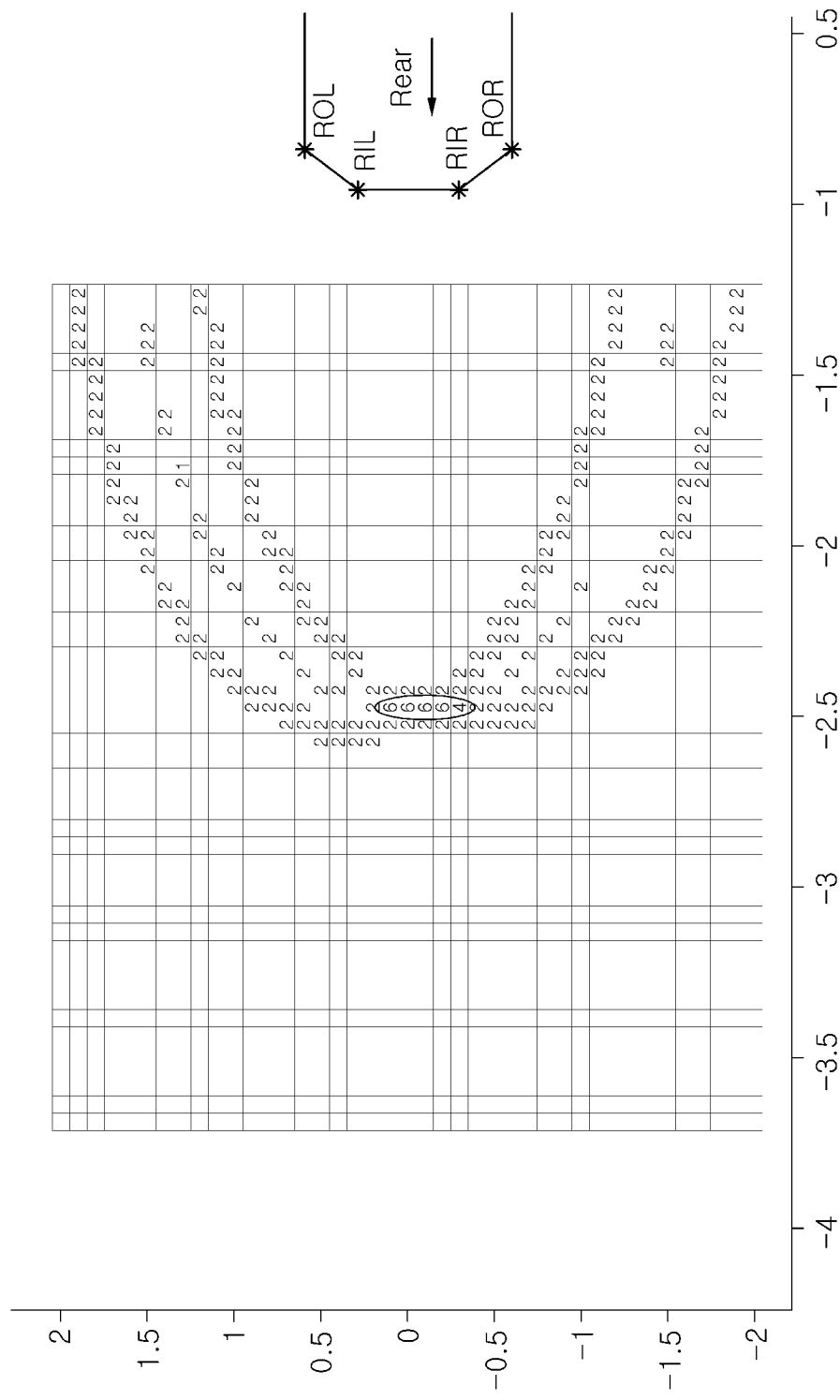
FIG. 4 is a diagram showing a grid map for estimating the position of an obstacle using a position map of the obstacle according to an exemplary embodiment of the present invention.

FIG. 4 is a diagram showing a grid map for estimating the position of an obstacle using a position map of the obstacle according to an embodiment of the present invention.

Further referring to FIG. 4, the position estimator 30 may estimate the position of the obstacle on the grid map using the position map of the obstacle, pre-stored in the storage unit 20, depending on a time of flight (TOF) of the reflection signal received by the sensor unit 10.

In detail, the position estimator 30 may estimate the position of the obstacle on the grid map using the position map depending on the TOF of reception of the plurality of sensors ROL, RIL, RIR, and ROR or using the position map of the obstacle based on a plurality of direct waves or indirect waves received by one sensor.

Accordingly, according to the present invention, the position of the obstacle may be estimated using the pre-stored position map depending on the TOF sensed by the plurality of sensors ROL, RIL, RIR, and ROR without calculation of the intersection point, thereby remarkably reducing the amount of computation.

The plurality of sensors ROL, RIL, RIR, and ROR may be spaced apart from each other in a lateral direction at front or rear sides of the vehicle and may transmit different transmission signals.

According to an embodiment, the position detection system according to the present invention may be applied to a vehicle. In particular, the plurality of sensors ROL, RIL, RIR, and ROR may each be positioned at each of the front and rear bumpers of the vehicle, and may be applied to a parking collision-avoidance assist (PCA) of the vehicle.

The plurality of sensors ROL, RIL, RIR, and ROR may be spaced apart from each other in a lateral direction at front or rear sides of the vehicle. In addition, the plurality of sensors ROL, RIL, RIR, and ROR may transmit transmission signals having different frequencies, and thus the sensor that receives the reflection signal may determine which sensor transmitted the transmission signal.

According to an embodiment, the four sensors ROR, RIR, RIL, and ROL spaced apart in a lateral direction of a vehicle may be arranged at the rear side of the vehicle. The four sensors ROR, RIR, RIL, and ROL may also be arranged in the same manner at the front side of the vehicle.

The grid map including the plurality of cells may include a plurality of rows and columns that extend in parallel to longitudinal and lateral directions of the vehicle from the front or rear side of the vehicle.

According to an embodiment, the grid map may include a plurality of cells including a plurality of columns and rows arranged parallel to the longitudinal and lateral directions of the vehicle and arranged in the longitudinal and lateral directions of the vehicle.

For example, the grid map may be configured by arranging cells that are set to 2.5 m in the longitudinal direction of the vehicle and 4 m in the lateral direction of the vehicle and are set to 0.05 m in the longitudinal direction of the vehicle and 0.1 m in the lateral direction of the vehicle in a plurality of columns and rows arranged parallel to the longitudinal and lateral directions of the vehicle.

The storage unit 20 may pre-store each of the position map of the obstacle based on a direct wave in the case in which a sensor for transmitting a transmission signal and a sensor for receiving a reflection signal are the same and an indirect wave in the case in which the sensor for transmitting the transmission signal and the sensor for receiving the reflection signal are different.

"Direct wave" refers to the case in which the transmission signal transmitted from a sensor is reflected off an obstacle and is received again by the same sensor, and "indirect wave" refers to the case in which the transmission signal transmitted from a sensor is reflected off the obstacle and is received by an adjacent sensor.

According to an embodiment, a direct wave is a signal that is transmitted and received by the same sensor, and when four sensors are present, four position maps of the obstacle may be pre-stored as ROR_ROR, RIR_RIR, RIL_RIL, and ROL_ROL.

An indirect wave is a signal transmitted and received by different adjacent sensors, and when four sensors are present, six position maps of the obstacle may be pre-stored as ROR_RIR, RIR_ROR, RIR_RIL, RIL_RIR, RIL_ROL, and ROL_RIL.

According to an embodiment, when four sensors are present, the storage unit 20 may pre-store a total of 10 position maps of the obstacle.

In more detail, the position maps of the obstacle based on direct waves may be pre-stored as the range of a distance by which the obstacle is spaced apart from the sensors depending on the TOF of the reflection signal on the grid map.

That is, the position maps of the obstacle based on the direct wave may be parts of a circle using the positions (posx1, posy1) of the sensor as the center and a distance from the position of the sensor depending on the TOF of the reflection signal as a radius.

$$((x-\text{pos}x1)^2+(y-\text{pos}1)^2=ToF^2$$

Here, the ToF stands for the distance from the position of the sensor depending on the time of flight (TOF) of the reflection signal, and according to an embodiment, may be calculated by multiplying the moving speed and the TOF of an ultrasonic wave.

The position maps of the obstacle based on the indirect wave may be pre-stored as the range of a distance by which the obstacle is spaced apart from the sensors depending on the TOF of the reflection signal on the grid map, which is the sum of a distance to the position of a sensor for transmitting a signal and a distance to the position of a sensor for receiving the signal.

That is, the position maps of the obstacle based on the indirect wave may be parts of an oval in which the position (posx1, posy1) of the sensor for transmitting the transmission signal and the position (posx2, posy2) of the sensor for receiving the reflection signal are used as peak points and the sum of the distances to the positions of the respective sensors is the distance of the reflection signal depending on the TOF.

$$\sqrt{(x-\text{pos}x1)^2+(y-\text{pos}y1)^2}+\sqrt{(x-\text{pos}x2)^2+(y-\text{pos}y2)^2}=D$$

D is the sum of the distances to the positions of the respective sensors, and according to an embodiment, may be calculated by multiplying the moving speed and the TOF of an ultrasonic wave.

Conventionally, there are problems in that it is difficult to calculate an intersection point with respect to an oval using an equation of the oval and in that the amount of computation is increased, and thus, in the case of indirect waves, an equation of a circle is also used like in the case of direct waves, and thus, there is a problem in that the accuracy of estimating the position of an obstacle is degraded. According to the present invention, an equation of an oval may be applied to the indirect waves, thereby accurately estimating the position of the obstacle.

The position estimator 30 may determine which cell is occupied by an obstacle depending on the TOF of the received reflection signal on the pre-stored position maps of the obstacle and may estimate the position of the obstacle based on the estimated occupied cell.

In detail, the position estimator 30 may determine a position map of the obstacle depending on the TOF of the received reflection signal, or may determine a position map of the obstacle depending on whether the received reflection signal is a direct wave or an indirect wave, and may determine which cell is occupied by the obstacle based on the determined position map of the obstacle.

The cell occupied by the obstacle may be an area in which there is a possibility that the obstacle is positioned based on the pre-stored position map of the obstacle. The position estimator 30 may estimate the position of the obstacle based on the cell determined to be occupied by the obstacle.

In more detail, the position estimator 30 may estimate a cell in which occupied cells overlap each other using a position map of the obstacle that is based on a direct wave or an indirect wave or using position maps of the obstacle, which are respectively estimated by the plurality of sensors ROL, RIL, RIR, and ROR, as the position of the obstacle.

That is, the position estimator 30 may estimate that an obstacle is positioned in a cell in which occupied cells overlap each other, based on a plurality of cells. The plurality of position maps may be position maps based on a plurality of reflection signals received by one sensor or position maps based on the reflection signals that are respectively received by the plurality of sensors ROL, RIL, RIR, and ROR. The position estimator 30 may estimate that an obstacle is positioned in a cell in which occupied cells overlap each other based on the plurality of position maps.

In more detail, the position estimator 30 may apply a higher weight to an occupied cell estimated using the position map of the obstacle based on the direct wave than to an occupied cell estimated using the position map of the obstacle based on the indirect wave.

According to an embodiment, the position estimator 30 may apply 2 points to the occupied cell estimated using the position map of the obstacle based on a direct wave and may apply 1 point to the occupied cell estimated using the position map of the obstacle based on an indirect wave. The position estimator 30 may estimate that an obstacle is positioned in a cell with 4 points or more when the occupied cells overlap each other.

That is, the position estimator 30 may estimate that an obstacle is positioned in a cell in which two or more occupied cells, estimated using the position map based on a direct wave, overlap each other or that the number of occupied cells estimated using the position map based on a direct wave is one and the number of occupied cells estimated using the position map based on an indirect wave is 2 or more.

Figure 5:
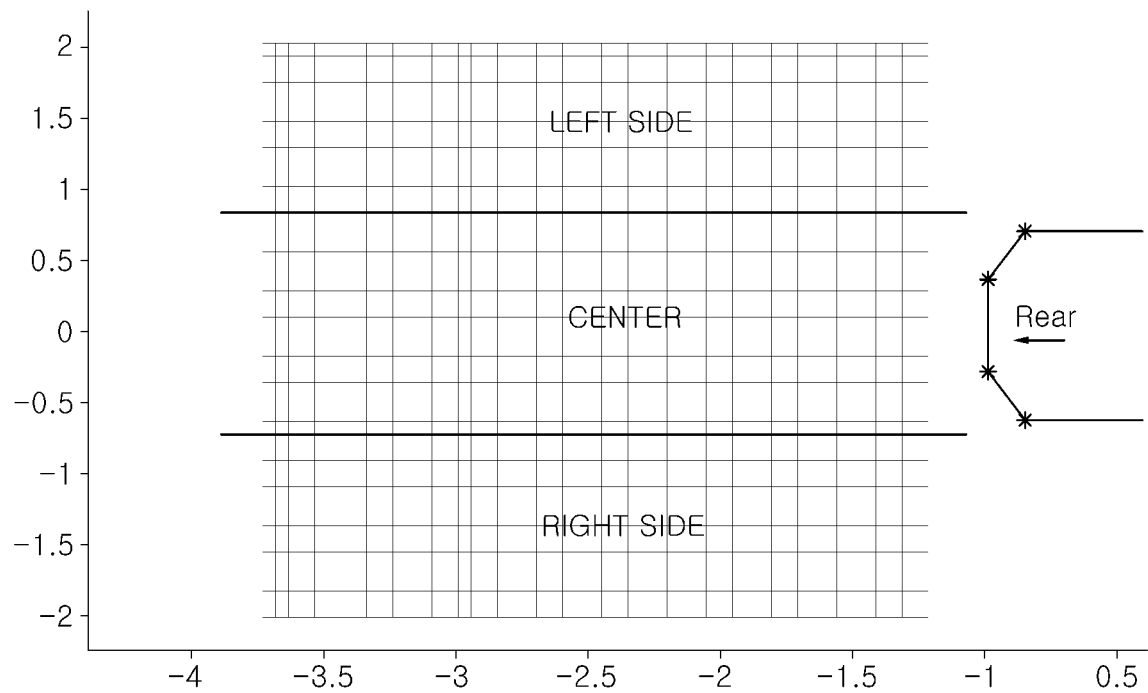
FIG. 5 is a diagram showing a plurality of sections included in a grid map according to an exemplary embodiment of the present invention.

FIG. 5 is a diagram showing a plurality of sections included in a grid map according to an embodiment of the present invention.

Further referring to FIG. 5, the position estimator 30 may divide the grid map into a plurality of sections and may estimate the position of the obstacle using only a reflection signal that is transmitted or received by some sensors that are preset among the plurality of sensors ROL, RIL, RIR, and ROR for each section resulting from division.

According to an embodiment, the grid map may be divided into a plurality of sections in the lateral direction of a vehicle. In particular, the position estimator 30 may divide the grid map into a left region, a central region, and a right region based on the overall width of the vehicle.

The position estimator 30 may estimate the position of the obstacle using only a reflection signal that is obtained by reflecting and inputting a transmission signal transmitted by some of a plurality of sensors for each section resulting from division or is received by some of the plurality of sensors.

According to an embodiment, with respect to an obstacle positioned in a left region, the position estimator 30 may estimate the position of the obstacle using only direct waves ROL_ROL and RIL_RIL of a sensor positioned on the left of the vehicle or indirect waves RIL_ROL, RIL_RIR, and ROL_RIL obtained by reflecting a transmitting signal transmitted by a sensor adjacent to the sensor positioned on the left of the vehicle and receiving the signal from the obstacle.

With respect to an obstacle positioned in a central region, the position estimator 30 may estimate the position of the obstacle using only direct waves RIL_RIL and RIR_RIR of a sensor positioned on a central portion of the vehicle or indirect waves RIR_RIL and RIL_RIR obtained by reflecting a transmitting signal transmitted by a sensor adjacent to the sensor positioned in the central portion of the vehicle and receiving the signal from the obstacle.

In addition, with respect to an obstacle positioned in a right region, the position estimator 30 may estimate the position of the obstacle using only direct waves ROR_ROR and RIR_RIR of a sensor positioned on the right of the vehicle or indirect waves RIR_ROR, RIR_RIL, and ROR_RIR obtained by reflecting a transmitting signal transmitted by a sensor adjacent to the sensor positioned on the right of the vehicle and receiving the signal from the obstacle.

That is, the position estimator 30 may divide a region around the vehicle into a plurality of sections, may estimate that only a signal transmitted or received by a preset sensor is effective for each corresponding section among a plurality of sensors arranged in a lateral direction of the vehicle, and may estimate the position of the obstacle using only the effective signal.

Figure 6:
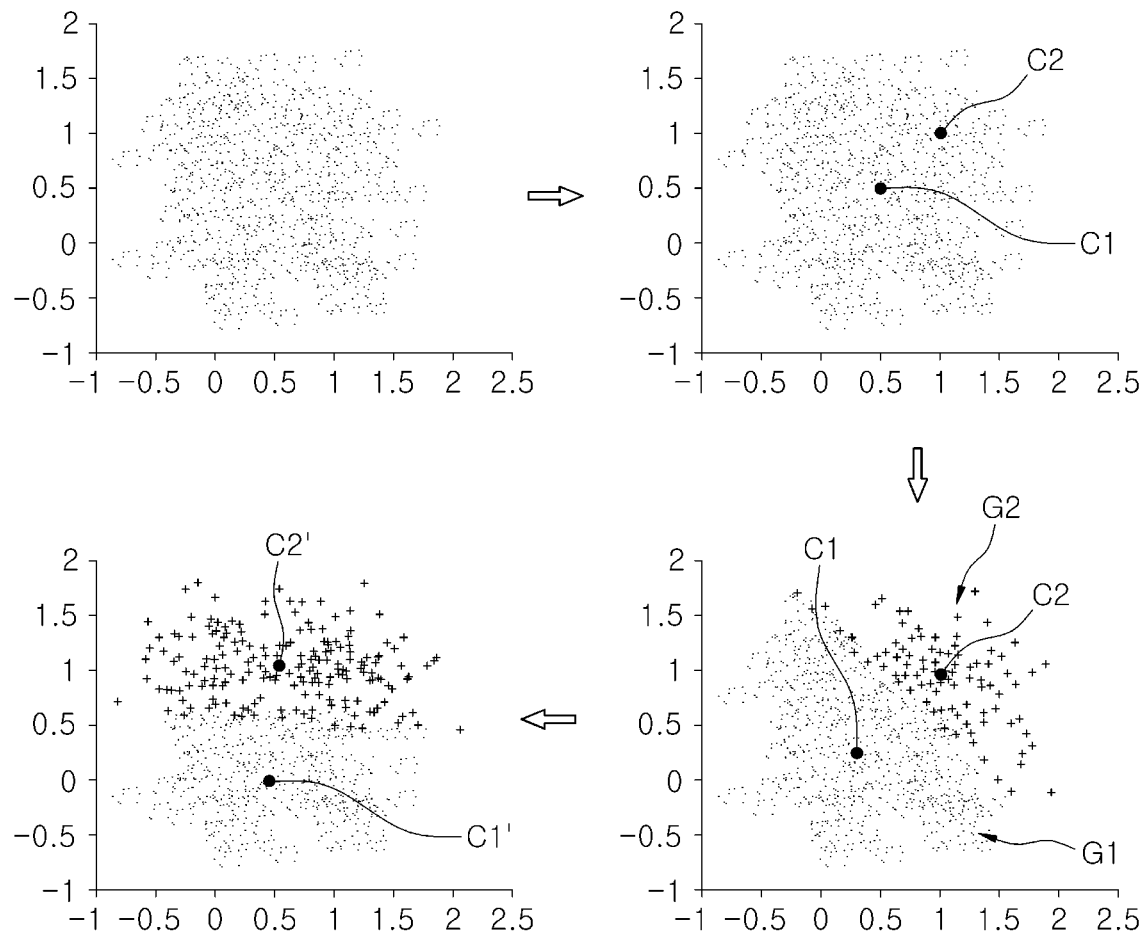
FIG. 6 is a diagram showing a procedure of clustering estimated positions of an obstacle according to an exemplary embodiment of the present invention.

FIG. 6 is a diagram showing a procedure of clustering estimated positions of an obstacle according to an embodiment of the present invention.

Further referring to FIG. 6, the position estimator 30 may divide a grid map into a plurality of sections, and when the number of positions of the obstacle estimated in the sections resulting from division is equal to or greater than a preset number, the number of positions of the obstacle may be reduced by clustering the positions of the obstacle.

According to an embodiment, in the grid map divided into the plurality of sections, the number of obstacles to be detected for each section may be set to a preset number. For example, the present number may be preset to three in the case of the left or right regions, and may be preset to six in the case of the central region.

When the number of positions of the obstacle, estimated by the position estimator 30, in particular, the number of cells estimated to be occupied by the obstacle, is equal to or greater than a preset number, the number of the estimated positions of the obstacle may be reduced by clustering cells estimated to be occupied by the obstacle.

According to an embodiment, as shown in FIG. 6, the position estimator 30 may cluster a plurality of cells estimated to be occupied by an obstacle using a K means clustering algorithm.

In detail, according to the K means clustering algorithm, C1 and C2 may be arbitrarily set as two centroids among a plurality of cells. In addition, distances from the centroids C1 and C2 set from each cell, and clusters C1' and C2' including a relatively close centroid, may be classified. Then, centroids C1' and C2' may be newly determined in the classified clusters G1 and G2.

The position estimator 30 may calculate distances from the newly determined centroids C1' and C2' and may classify a cluster including a relatively close centroid again. The position estimator 30 may cluster cells estimated to be occupied by an obstacle while repeatedly performing this procedure a preset number of times.

Figure 7:
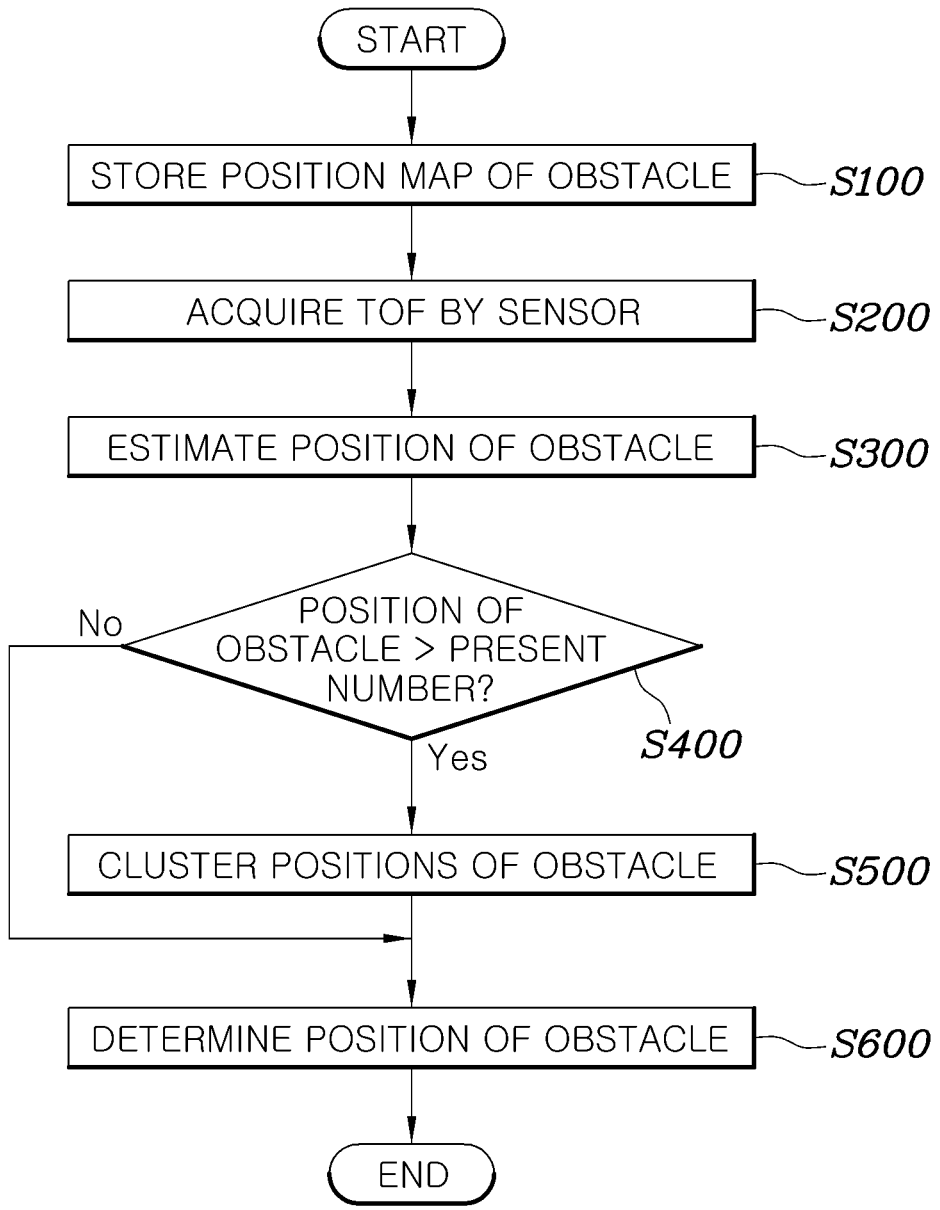
FIG. 7 is a flowchart showing a position detection method using a sensor according to an exemplary embodiment of the present invention.

FIG. 7 is a flowchart showing a position detection method using a sensor according to an embodiment of the present invention.

Further referring to FIG. 7, the position detection method using a sensor according to an embodiment of the present invention may include operation S100 of storing a position map of an obstacle depending on a time of flight (TOF) of a reflection signal on a grid map including a plurality of cells, operation S200 of acquiring the TOF of the reflection signal received by the plurality of sensors ROL, RIL, RIR, and ROR for transmitting a transmission signal or receiving the reflection signal reflected from the obstacle, and operation S300 of estimating the position of the obstacle by applying the TOF of the reflection signal received by each sensor to pre-stored position maps of the obstacle.

In operation S100 of storing the position map of the obstacle, each of position maps of the obstacle based on a direction wave, in the case in which a sensor for transmitting a transmission signal and a sensor for receiving a reflection signal are the same, or an indirect wave, in the case in which the sensor for transmitting the transmission signal and the sensor for receiving the reflection signal are different, may be stored.

In operation S300 of estimating the position of the obstacle, the cell occupied by the obstacle may be estimated depending on the TOF of the reflection signal received on the pre-stored position maps of the obstacle, and the position of the obstacle may be estimated based on the estimated occupied cell.

In operation S300 of estimating the position of the obstacle, a cell in which occupied cells overlap each other using the position map of the obstacle based on a direct wave or an indirect wave or position maps of the obstacle, which are respectively estimated by the plurality of sensors ROL, RIL, RIR, and ROR may be estimated as the position of the obstacle.

In operation S300 of estimating the position of the obstacle, the grid map may be divided into a plurality of sections, and the position of the obstacle may be estimated using only a reflection signal that is transmitted or received by some sensors that are preset among the plurality of sensors ROL, RIL, RIR, and ROR for each section resulting from division.

After operation S300 of estimating the position of the obstacle, the method may further include operation S500 of reducing the number of positions of the obstacle by clustering the positions of the obstacle when the number of the positions of the obstacle estimated in the section resulting from division is equal to or greater than a preset number (S400).

After operation S500 of reducing the number of the positions of the obstacle, the method may further include operation S600 of determining the position of the obstacle when the reduced number of positions of the obstacle is less than a preset number (S400).

The position detection system and method using a sensor according to the present invention may remarkably reduce the amount of computation, a large amount of which is needed to calculate an intersection point to detect the position of an obstacle in a conventional manner.

In addition, an oval position map may be applied to a signal of an indirect wave, thereby improving the accuracy of detection of the position of the obstacle.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A position detection system comprising:
    a sensor unit comprising a plurality of sensors for transmitting a transmission signal and receiving a reflection signal reflected from an obstacle and configured to acquire a time of flight (TOF) of the received reflection signal;
    a storage unit configured to pre-store a position map of the obstacle for respective sensors depending on the TOF of the reflection signal on a grid map comprising a plurality of cells; and
    a position estimator configured to estimate a position of the obstacle based on the TOF of the reflection signal received by the sensor unit and the position map of the obstacle pre-stored in the storage unit,
    wherein:
    the position estimator estimates a cell occupied by the obstacle depending on the TOF of the received reflection signal on pre-stored position maps of the obstacle and estimates the position of the obstacle based on the estimated occupied cell;
    the position estimator estimates that the object is positioned in a cell in which occupied cells overlap each other using a position map of the obstacle based on a direct wave or an indirect wave or using position maps of the obstacle respectively estimated by the plurality of sensors, as the position of the obstacle; and
    the position estimator applies a higher weight to an occupied cell estimated using the position map of the obstacle based on the direct wave than to an occupied cell estimated using the position map of the obstacle based on the indirect wave.

2. The position detection system of claim 1, wherein the plurality of sensors are spaced apart from each other in a lateral direction on front and rear sides of a vehicle and transmit different transmission signals.

3. The position detection system of claim 2, wherein the grid map comprising the plurality of cells comprises a plurality of rows and columns that extend parallel to longitudinal and lateral directions of the vehicle from the front or rear side of the vehicle.

4. The position detection system of claim 1, wherein the storage unit pre-stores each of:
    a position map of the obstacle based on a direct wave in a case in which the sensor for transmitting the transmission signal and the sensor for receiving the reflection signal are the same; and
    a position map of the obstacle based on an indirect wave in a case in which the sensor for transmitting the transmission signal and the sensor for receiving the reflection signal are different.

5. The position detection system of claim 4, wherein the position maps of the obstacle based on the direct wave are pre-stored as a range of a distance by which the obstacle is spaced apart from the sensors depending on the TOF of the reflection signal on the grid map.

6. The position detection system of claim 4, wherein the position maps of the obstacle based on the indirect wave are pre-stored as a range of a distance by which the obstacle is spaced apart from the sensors depending on the TOF of the reflection signal, which is a sum of a distance to a position of the sensor for transmitting the transmission signal and a distance to a position of the sensor for receiving the reflection signal on the grid map.

7. The position detection system of claim 1, wherein the position estimator divides the grid map into a plurality of sections and estimates the position of the obstacle using only a reflection signal that is transmitted or received by some sensors that are preset among the plurality of sensors for each section resulting from division.

8. The position detection system of claim 1, wherein the position estimator divides the grid map into a plurality of sections, and when a number of positions of the obstacle estimated in the sections resulting from division is equal to or greater than a preset number, the number of positions of the obstacle is reduced by clustering the positions of the obstacle.

9. A position detection method comprising:
    pre-storing a position map of an obstacle for each of a plurality of sensors depending on a time of flight (TOF) of a reflection signal on a grid map comprising a plurality of cells;
    acquiring the TOF of the reflection signal received by the plurality of sensors for transmitting a transmission signal and receiving the reflection signal reflected from the obstacle; and
    estimating a position of the obstacle by using the TOF of the reflection signal received by each sensor to pre-stored position maps of the obstacle,
    wherein the estimating the position of the obstacle comprises:
    estimating a cell occupied by the obstacle depending on the TOF of the reflection signal received on the pre-stored position maps of the obstacle and estimating the position of the obstacle based on the estimated occupied cell;

estimating that the object is positioned in a cell in which occupied cells overlap each other using the position map of the obstacle based on a direct wave or an indirect wave or using position maps of the obstacle respectively estimated by the plurality of sensors; and applying a higher weight to an occupied cell estimated using the position map of the obstacle based on the direct wave than to an occupied cell estimated using the position map of the obstacle based on the indirect wave.

10. The position detection method of claim 9, wherein the storing the position map of the obstacle comprises storing each of position maps of the obstacle based on a direct wave in a case in which a sensor for transmitting a transmission signal and a sensor for receiving a reflection signal are the same and an indirect wave in a case in which the sensor for transmitting the transmission signal and the sensor for receiving the reflection signal are different.

11. The position detection method of claim 9, wherein the estimating the position of the obstacle comprises dividing the grid map into a plurality of sections and estimating the position of the obstacle using only a reflection signal that is transmitted or received by some sensors that are preset among the plurality of sensors for each section resulting from division.

12. The position detection method of claim 9, further comprising: after the estimating the position of the obstacle, dividing the grid map into a plurality of sections and reducing a number of positions of the obstacle by clustering the positions of the obstacle when a number of the positions of the obstacle estimated in the sections resulting from division is equal to or greater than a preset number.

* * * * *